US009050911B2

(12) United States Patent
Wieclawski et al.

(10) Patent No.: US 9,050,911 B2
(45) Date of Patent: Jun. 9, 2015

(54) LATCHING SYSTEM ASSOCIATED WITH A SEAT

(75) Inventors: Stanislaw Andrzej Wieclawski, Hohenkammer (DE); Krzysztof Wroblewski, Washington, MI (US)

(73) Assignee: Lear Corporation, Southfield, MI (US)

( * ) Notice: Subject to any disclaimer, the term of this patent is extended or adjusted under 35 U.S.C. 154(b) by 204 days.

(21) Appl. No.: 13/386,721

(22) PCT Filed: Aug. 23, 2010

(86) PCT No.: PCT/US2010/046264
§ 371 (c)(1),
(2), (4) Date: Jan. 24, 2012

(87) PCT Pub. No.: WO2011/022714
PCT Pub. Date: Feb. 24, 2011

(65) Prior Publication Data
US 2012/0133188 A1 May 31, 2012

Related U.S. Application Data

(60) Provisional application No. 61/235,778, filed on Aug. 21, 2009.

(51) Int. Cl.
*B60N 2/44* (2006.01)
*B60N 2/20* (2006.01)
*B60N 2/22* (2006.01)
*B60N 2/36* (2006.01)

(52) U.S. Cl.
CPC ......... *B60N 2/2245* (2013.01); *Y10T 24/45597* (2015.01); *B60N 2/366* (2013.01)

(58) Field of Classification Search
CPC .. B60N 2/366; B60N 2/01583; B60N 2/2245; B60N 2205/20; Y10T 24/45597
USPC ........................ 297/378.13, 378.12, 335–336; 292/DIG. 61; 296/68, 65.16, 65.17
See application file for complete search history.

(56) References Cited

U.S. PATENT DOCUMENTS

| 5,662,369 | A | * | 9/1997 | Tsuge .............................. 296/66 |
| 5,664,839 | A | * | 9/1997 | Pedronno et al. ........ 297/378.13 |
| 5,700,056 | A | * | 12/1997 | Bernard .................... 297/378.13 |
| 6,149,210 | A | * | 11/2000 | Hunt et al. ..................... 292/216 |
| 6,341,820 | B1 | | 1/2002 | Kimura et al. |
| 6,422,616 | B1 | * | 7/2002 | Wortmann et al. ........... 292/216 |
| 6,945,585 | B1 | * | 9/2005 | Liu et al. ..................... 296/65.03 |
| 7,032,973 | B2 | * | 4/2006 | Reubeuze ................ 297/378.13 |
| 7,152,900 | B2 | | 12/2006 | Trombley et al. |
| 7,309,095 | B2 | | 12/2007 | O'Connor |
| 7,377,584 | B2 | | 5/2008 | Griswold et al. |
| 7,410,217 | B2 | * | 8/2008 | Inoue et al. .............. 297/378.13 |

(Continued)

FOREIGN PATENT DOCUMENTS

| CN | 101301865 A | | 11/2008 | |
| DE | 10159533 A1 | * | 6/2003 | ............... B60N 2/36 |

(Continued)

*Primary Examiner* — David R Dunn
*Assistant Examiner* — Tania Abraham
(74) *Attorney, Agent, or Firm* — Brooks Kushman P.C.

(57) ABSTRACT

A latching system that may be associated with a seat. The latching system may include a latch arm configured to engage a striker and a biasing member having a first portion. The latch arm moves from an unlatched position to a latched position when the first portion disengages the latch arm.

18 Claims, 7 Drawing Sheets

(56) References Cited

U.S. PATENT DOCUMENTS

| | | | |
|---|---|---|---|
| 7,416,254 B2* | 8/2008 | Jennings | 297/378.12 |
| 7,490,908 B2* | 2/2009 | Wieclawski | 297/378.13 |
| 8,267,458 B2* | 9/2012 | Lindsay | 296/65.16 |
| 2007/0052255 A1 | 3/2007 | O'Connor | |
| 2007/0052256 A1 | 3/2007 | Trombley et al. | |
| 2009/0008981 A1 | 1/2009 | Wieclawski | |
| 2009/0021067 A1 | 1/2009 | Griswold et al. | |
| 2009/0033138 A1 | 2/2009 | Yamada et al. | |

FOREIGN PATENT DOCUMENTS

| | | |
|---|---|---|
| DE | 102004037289 A1 | 3/2006 |
| WO | 2008122418 A2 | 10/2008 |

* cited by examiner

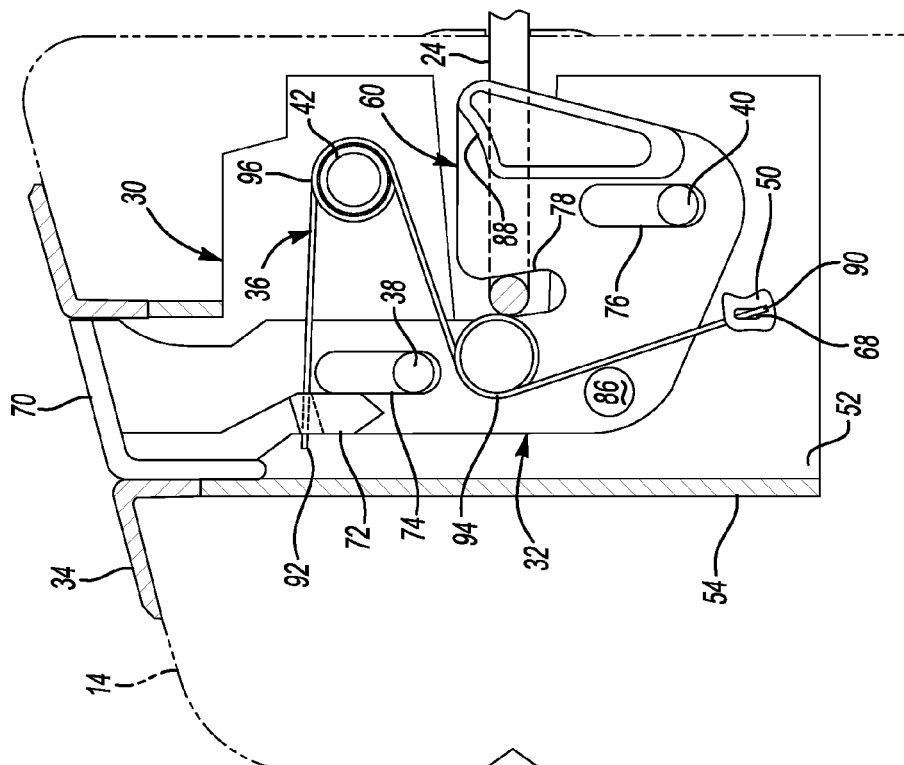
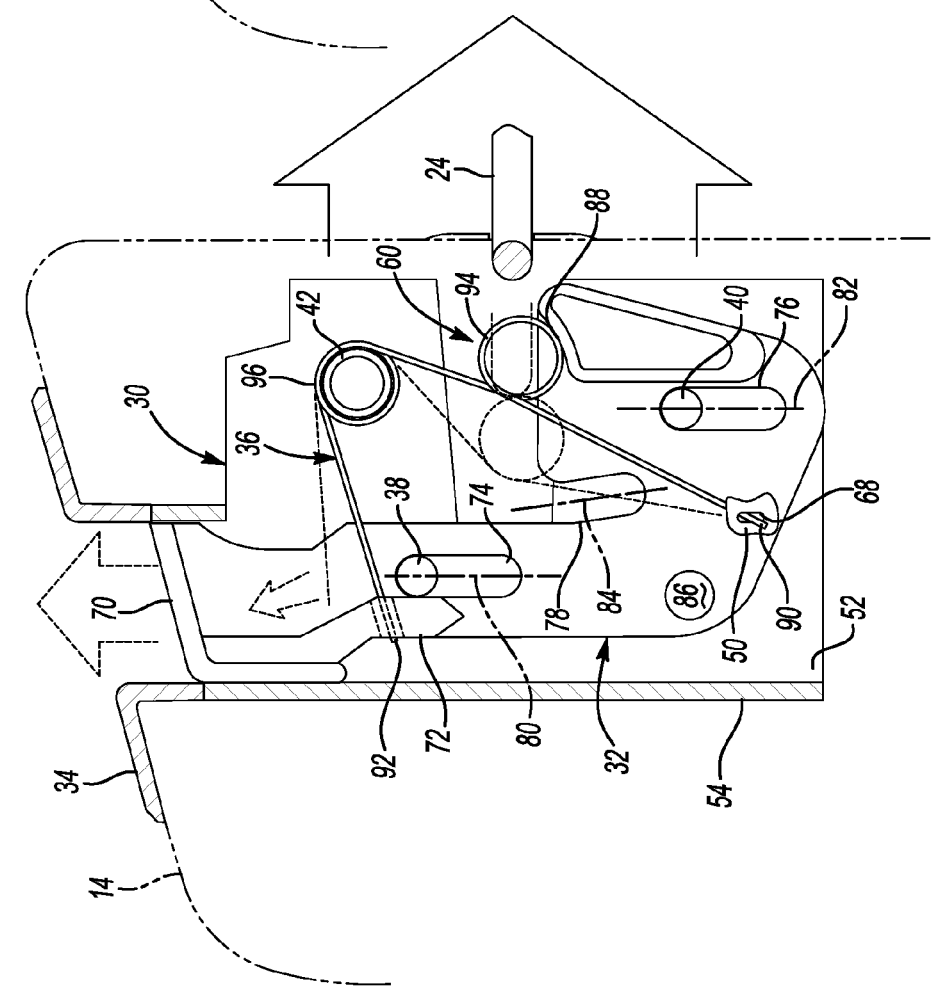

LATCHING SYSTEM ASSOCIATED WITH A SEAT

CROSS-REFERENCE TO RELATED APPLICATION

This application is a U.S. national phase of PCT Appln. No. PCT/US2010/046264 filed Aug. 23, 2010, the disclosure of which is hereby incorporated by reference in its entirety.

TECHNICAL FIELD

The present invention relates to a latching system that may be associated with a seat.

SUMMARY

In at least one embodiment a latching system is provided. The latching system may include a latch arm configured to engage a striker and a biasing member having a first portion. The latch arm moves from an unlatched position to a latched position when the first portion disengages the latch arm.

In at least one embodiment a latching system associated with a seat is provided. The latching system may include a housing having an opening, a latch arm, and a biasing member. The latch arm is moveably disposed in the opening and configured to move between an unlatched position and a latched position. The biasing member has a first portion that engages the latch arm to hold the latch arm in the unlatched position. The biasing member may bias the latch arm toward the latched position when the first portion disengages the latch arm.

In at least one embodiment a latching system associated with a seat is provided. The latching system may include a latch assembly having a housing, a latch arm, and a biasing member. The latch arm is moveably disposed on the housing and configured to move between a latched position and an unlatched position. The biasing member has a first portion that engages the latch arm to hold the latch arm in the unlatched position. The biasing member biases the latch arm to the unlatched position when the first portion disengages the latch arm.

BRIEF DESCRIPTION OF THE DRAWINGS

FIG. 4 is a side section view of the latching system showing the latch assembly in the unlatched condition.

FIG. 5 is a side section view of the latching system showing the latch assembly in a latched condition.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
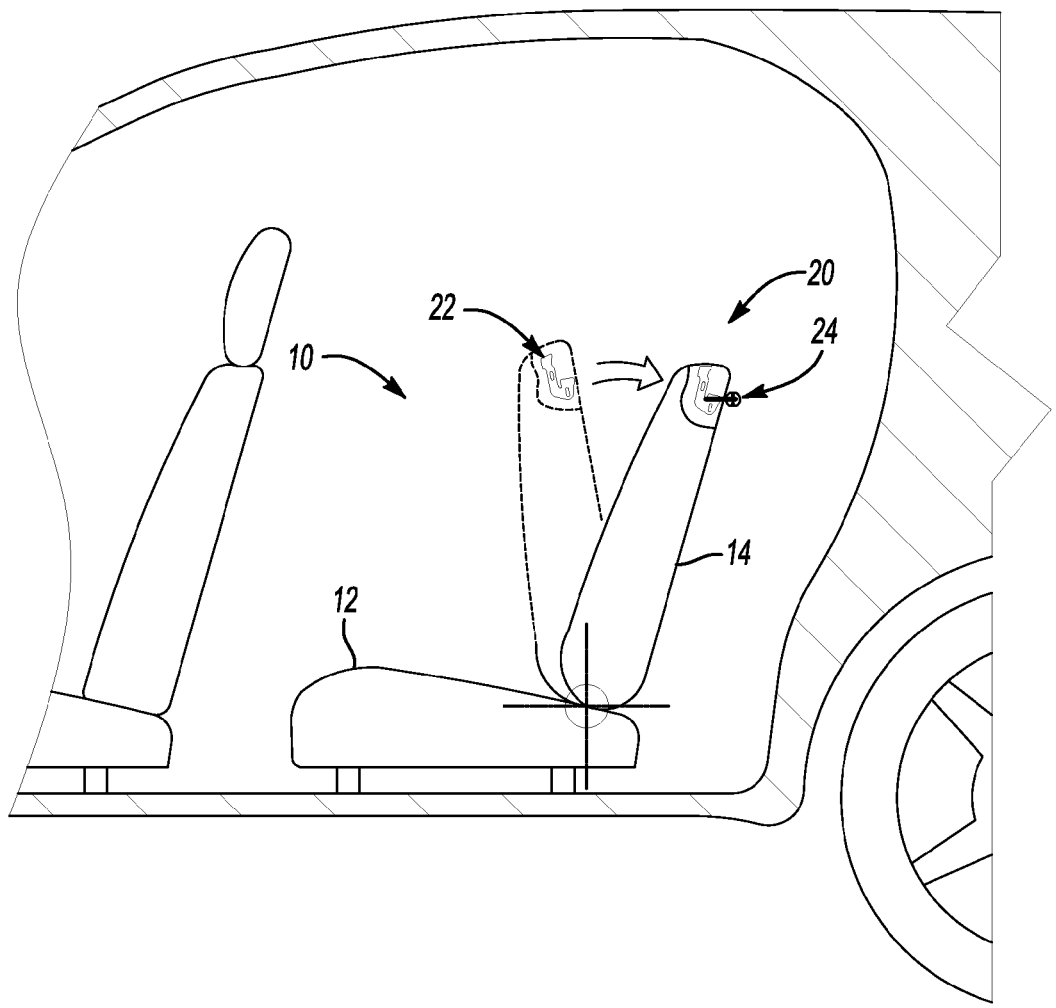
FIG. 1 is a side view of an exemplary seat assembly.
Figure 2:
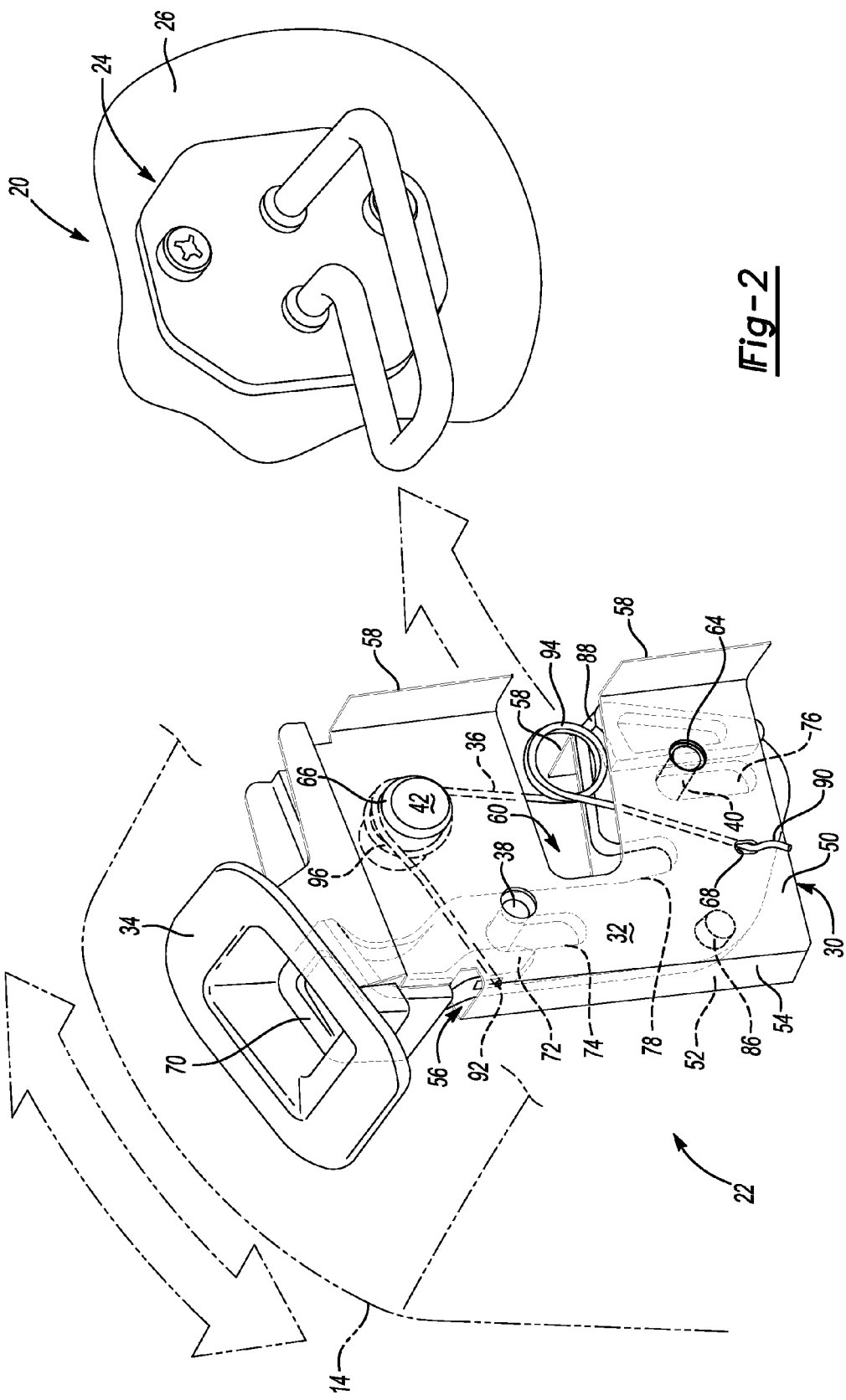
FIG. 2 is a perspective view of a first embodiment of a latching system having a striker assembly and a latch assembly disposed in an unlatched condition.

Referring to FIGS. 1 and 2, an exemplary seat assembly 10 is shown. The seat assembly 10 may be configured for use in a vehicle, such as a motor vehicle like a car or truck, or for non-automotive applications.

The seat assembly 10 may include a seat bottom 12 and a seat back 14. The seat bottom 12 may be configured to be mounted on a support surface, such as a floor pan of a vehicle. The seat back 14 may be pivotally disposed on the seat bottom 12.

A latching system 20 may be associated with the seat assembly 10. The latching system 20 may include a latch assembly 22 and a striker assembly 24. The latch assembly 22 may be configured to engage the striker assembly 24 to inhibit movement of the seat back 14 and may disengage the striker assembly 24 to permit movement of the seat back 14. The latch assembly 22 may be disposed on the seat back 14 and striker assembly 24 may be fixedly disposed on a mounting surface 26, such as a vehicle body, or vice versa.

Figure 3:
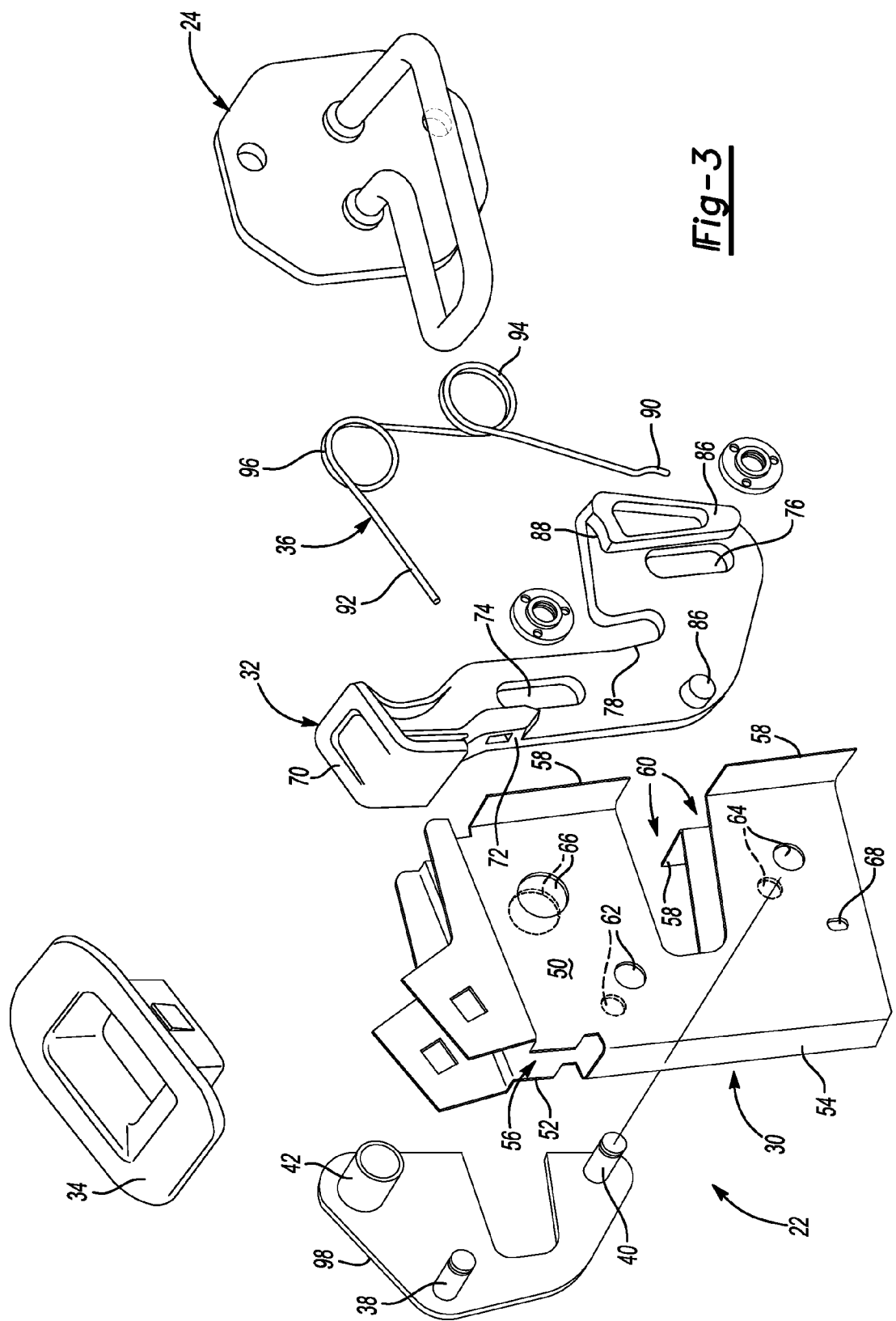
FIG. 3 is an exploded view of the latch assembly of FIG. 2 and a perspective view of the striker assembly.

Referring to FIGS. 2-4, the latch assembly 22 is shown in more detail. The latch assembly 22 may include a housing 30, a latch arm 32, a bezel 34, a biasing member 36, a first pin 38, a second pin 40, and a third pin 42.

The housing 30 may be configured to receive components of the latch assembly 22 and to facilitate mounting of the latch assembly 22. The housing 30 may be made of any suitable material, such as a metal like steel.

The housing 30 may be generally U-shaped and may have a first wall 50, a second wall 52, and a third wall 54. The first wall 50 and second wall 52 may be spaced apart from each other. The third wall 54 may extend from the first wall 50 to the second wall 52. As such, the first, second, and third walls 50, 52, 54 may cooperate to at least partially define an opening 56 therebetween.

One or more flanges 58 may be provided that extend from ends of the first and second walls 50, 52 to facilitate mounting of the latch assembly 22. The flanges 58 may be coupled to another component, such as a seat back 14, with fasteners that extend through holes in the flanges, by welding, or the like in one or more embodiments.

The first and second walls 50, 52 may each include a striker opening 60 that is adapted to receive the striker assembly 24. The striker openings 60 in the first and second walls 50, 52 may be aligned with each other and may have similar configurations. In addition, the striker openings 60 may extend toward and may be spaced apart from the third wall 54.

The first and/or second walls 50, 52 may also include a first hole 62, a second hole 64, and a third hole 66. Each hole 62, 64, 66 on the first wall 50 may be aligned with a corresponding hole 62, 64, 66 on the second wall 52. For instance, the first hole 62 on the first wall 50 may be aligned or coaxially disposed with the first hole 62 on the second wall 52, with similar arrangements for the second and third holes 64, 66. The first, second, and third holes 62, 64, 66 may receive the first, second and third pins 38, 40, 42, respectively.

The first or second wall 50, 52 may include an engagement feature 68 for engaging the biasing member 36 as will be described in more detail below. The engagement feature 68 may have a male or a female configuration in one or more embodiments. In FIGS. 2 and 3, the engagement feature 68 is configured as a through hole in the first wall 50.

The latch arm 32 may be moveably disposed in the opening 56 and may be configured to move between an unlatched position shown in FIGS. 2 and 4 and a latched position shown in FIG. 5. The latch arm 32 may include a button 70, an engagement feature 72, a first slot 74, a second slot 76, and a striker slot 78.

The button 70 may be provided at an end of the latch arm 32. In the embodiment shown, the button 70 is integrally formed with the latch arm 32. As such, the latch arm 32 may be provided as a one-piece component. Alternatively, the button 70 may be separated from the latch arm 32 and connected thereto by a link, such as a wire, which may be provided in various lengths to vary the spacing between the button 70 and the latch arm 32. The button 70 may be disposed in the bezel 34, which may overlap or cover an exterior surface of the seat assembly 10 to provide a desired aesthetic appearance. The bezel 34 may be fixedly mounted to the seat assembly 10 and/or the housing 30 in any suitable manner, such as with a fastener like a snap tab. In at least one other embodiment, the bezel 34 may be provided with an input feature like a handle that may move or pivot to engage the button 70 and actuate the latch arm 32.

The engagement feature 72 may be provided to engage the biasing member 36 as will be described in more detail below. The engagement feature 72 may have a male or a female configuration in one or more embodiments. In FIG. 2, the engagement feature 72 may have a hole or slot that is provided in an enlarged portion of the latch arm 32 near the button 70.

The first and second slots 74, 76 may be provided to help guide movement of the latch arm 32. The first and second slots 74, 76 may be generally disposed parallel to each other in one or more embodiments. For instance, the first and second slots 74, 76 may be disposed along first and second slot axes 80, 82 that may be disposed substantially parallel to each other as is best shown in FIG. 4. The first and second slots 74, 76 may receive the first and second pins 38, 40, respectively. In at least one embodiment, the first pin 38 may extend through the first hole 62 in the first wall 50, the first slot 74, and the first hole 62 in the second wall 52. Similarly, the second pin 40 may extend through the second hole 64 in the first wall 50, the second slot 76, and the second hole 64 in the second wall 52. The first and second pins 38, 40 may have any suitable configuration. For instance, the first and second pins 38, 40 may be configured as pins or as bolts that may engage a fastener such as a nut that may be fixedly or non-fixedly disposed on the housing 30.

The striker slot 78 may be provided on the latch arm 32 for receiving the striker assembly 24. The striker slot 78 may be generally disposed between the first and second slots 74, 76 and may help configure the latch arm 32 with a hook-like arrangement. The striker slot 78 may be disposed at an angle with respect to the first and second slots 74, 76 to help reduce latching effort. As is best shown in FIG. 4, the striker slot 78 may be disposed along a striker slot axis 84 that may not be disposed parallel to the first and second slot axes 80, 82. The striker slot axis 84 may be disposed at an angle such that the bottom of the striker slot 78 is disposed further from the third wall 54 than the top of the striker slot 78. Although the striker slot 78 is shown with a linear configuration in FIGS. 2-4, it is also contemplated that the striker slot 78 may be non-linear or curved in one or more embodiments.

The latch arm 32 may also include one or more alignment features 86 that may help guide movement or help maintain orientation of the latch arm 32 in the opening 56. The alignment features 86 may be provided at various locations to help the latch arm 32 engage the first and second walls 50, 52. In addition, the latch arm 32 may include a biasing member engagement feature 88 that may engage the biasing member 36 as will be discussed in more detail below. The biasing member engagement feature 88 may be disposed between the second slot 76 or striker slot 78 and an end or side of the latch arm 32 disposed opposite the third wall 54.

The biasing member 36 may be disposed in the opening 56 in the housing 30 and may exert a biasing force on the latch arm 32 to facilitate positioning of the latch arm 32. The biasing force exerted by the biasing member 36 may help hold the latch arm 32 in the unlatched and latched positions as will be described in more detail below. The biasing member 36 may be made of any suitable material. For instance, the biasing member 36 may be configured as a spring that may be made of a metal wire.

The biasing member 36 may include a first end 90 and a second end 92 disposed opposite the first end 90. The first and second ends 90, 92 may engage engagement features 68 and 72, respectively. The biasing member 36 may also include first and second portions 94, 96. The first and second portions, 94, 96. The first and second portions 94, 96 may include or be configured as coils and may be disposed between the first and second ends 90, 92. The first portion 94 may be disposed closer to the first end 90 than the second portion 96 and may be disposed proximate or generally aligned with the striker openings 60. The second portion 96 may be disposed around the third pin 42 and may be disposed generally above the first portion 94. In at least one embodiment, the second portion 96 may engage or extend completely around the circumference of the third pin 42 and help hold the second portion 96 in a generally stationary position with respect to the housing 30.

A reinforcement plate 98 may be provided on the housing 30. In at least one embodiment, the reinforcement plate 98 may be provided on a exterior surface of the first or second walls 50, 52 and may include a striker opening similar to the striker opening 60 on the first and second walls 50, 52. The reinforcement plate 98 may also engage or receive the first, second, and/or third pins 38, 40, 42. In at least one embodiment, one or more of the pins 38, 40, 42 may be integrally formed with the reinforcement plate 98.

Referring to FIGS. 4 and 5, operation of the latching system 20 will now be described in more detail.

In FIG. 4, the latch assembly 22 is shown in an unlatched position. The latch assembly 22 may be in the unlatched position when it is disengaged from the striker assembly 24, such as when the seat back 14 is folded toward the seat bottom 12. In the unlatched position, the first portion 94 may be disposed on the biasing member engagement feature 88. As such, the first portion 94 may appear to be disposed in the striker opening 60 when viewed from the perspective shown in FIG. 4. The first portion 94 may hold the biasing member engagement feature 88 along or below the striker openings 60 to permit the latch assembly 22 to receive the striker assembly 24. In addition, the first and second pins 38, 40 may disposed against top ends of the first and second slots 74, 76, respectively, and the button 70 may be recessed from a top surface of the bezel 34.

Engagement of the striker assembly 24 against the biasing member 36 may actuate the latch assembly 22 toward a latched position. Movement toward the latched position is depicted in phantom in FIG. 4.

In FIG. 5, the latch assembly 22 is shown in a latched position. The latch assembly 22 may move to the latched position in response to engagement with the striker assembly 24. For instance, sufficient folding of the seat back 14 toward the striker assembly 24 may cause the striker assembly 24 to enter the striker opening 60 and engage the first portion 94. Force exerted on the first portion 94 may move the first portion 94 toward the third wall 54 and disengage the first portion 94 from the biasing member engagement feature 88. The first portion 94 may then generally move across or above the striker slot 78 and away from the biasing member engagement feature 88. The striker assembly 24 may be generally positioned above the striker slot 78 after the first portion 94 disengages the biasing member engagement feature 88. Moreover, the biasing member 36 may be configured to snap toward the third wall 54 under its own biasing force. The latch arm 32 may then move upward to secure the striker assembly 24 in the striker slot 78 under a biasing force exerted by the biasing member 36. Movement of the latch arm 32 may continue until the striker assembly 24 engages the bottom the striker slot 76 and/or until the first and second pins 38, 40 are disposed against bottom ends of the first and second slots 74, 76, respectively. Movement of the latch arm 32 may also be substantially linear and may extend in a direction along or substantially parallel to the first and second slot axes 80, 82. In addition, the button 70 may move upward or toward the top surface of the bezel 34.

The latch assembly 22 may be actuated from the latched position toward the unlatched position in various ways.

First, unlatching may occur in response to a sufficient actuation force exerted upon the button 70. A sufficient actuation force may cause the latch arm 32 to move downward and return to the position in FIG. 4. Movement of the latch arm 32 may then permit the biasing member 36 to return to the position shown in FIG. 4 due in part to the biasing force exerted by the first and/or second portions 94, 96.

Second, unlatching may occur in response to a sufficient actuation force exerted on another portion of the latch arm 32, such as proximate the biasing member engagement feature 88. An example of this is shown with reference to FIGS. 6 and 7.

Figure 6:
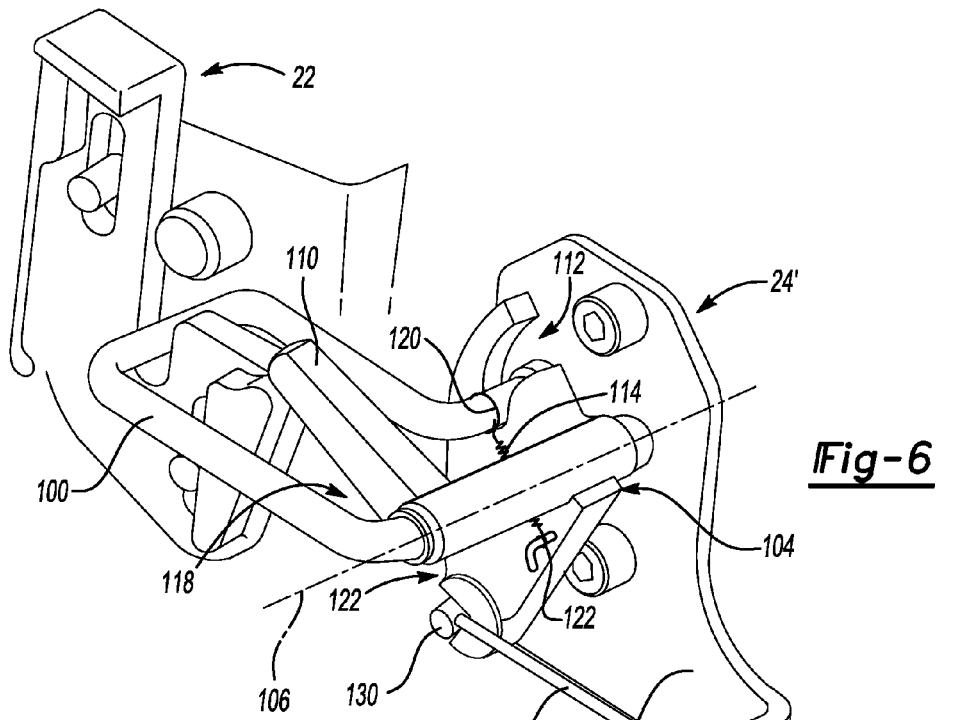
FIG. 6 is perspective view of a second embodiment of a striker assembly and the latch assembly in a latched condition.

In FIG. 6, a second embodiment of a striker assembly 24' is shown. The striker assembly 24' may include a striker 100 disposed on a mounting plate 102 that may have the same or similar configuration as striker assembly 24 in FIGS. 2-5. In addition, the striker assembly 24' may include a release unit 104. The release unit 104 may be pivotally disposed on the striker 100 and may be configured to rotate about an axis of rotation 106. The release unit 104 may include an engagement arm 110, an alignment slot 112, a biasing member 114, and an actuator 116.

The engagement arm 110 may generally extend away from the axis of rotation 106 and toward the latch assembly 22. The engagement arm 110 may be disposed in an opening 118 in the striker 100. The alignment slot 112 may be spaced apart from the engagement arm 110 and may receive a portion of the striker 100.

The biasing member 114 may exert a biasing force on the release unit 104. In at least one embodiment, the biasing member 114 may include a first end 120 disposed on the striker 100 and a second end 122 disposed on the release unit 104. In FIG. 6, the biasing member 114, which may be configured as a spring, is disposed between the engagement arm 110 and the alignment slot 112 for clarity. Alternatively, the biasing member 114 may be disposed on the opposite side of the release unit 104 between the release unit 104 and the mounting plate 102. The biasing force exerted by the biasing member 114 may rotate the release unit 104 about the axis of rotation 106 such that the engagement arm 110 moves away from the latch assembly 22, or in a clockwise direction from the perspective shown in FIG. 6. Rotation of the release unit 104 in this direction may be inhibited when an end of the alignment slot 112 engages the striker 100.

The actuator 116 may be provided to actuate the release unit 104. The actuator 116 may have any suitable configuration. In the embodiment shown, the actuator 116 is configured as a cable, but could also be an electrical or electromechanical device, such as a solenoid. The actuator 116 may engage or be coupled to the release unit 104 and may exert an actuating force on the release unit 104. In a cable-based embodiment, the actuator 116 may have a first end 130 that engages the release unit 104 and a second end 132 disposed opposite the first end 130. The second end 132 may be associated with or coupled to an input device 134, such as button. The input device 134 may be located remotely from the seat assembly 10. For instance, in an automotive application, the input device 134 may be located toward a rear of the vehicle, such as in a trunk or hatchback area, or toward the front of the vehicle, such as near a front passenger seating area.

Referring to FIG. 6, the latch assembly 22 is disposed in a latched position and in engagement with a striker assembly 24'. The engagement arm 110 of the release unit 104 may be spaced apart from the latch arm 32 or may engage the latch arm 32 but not exert sufficient force to actuate the latch arm 32.

Figure 7:
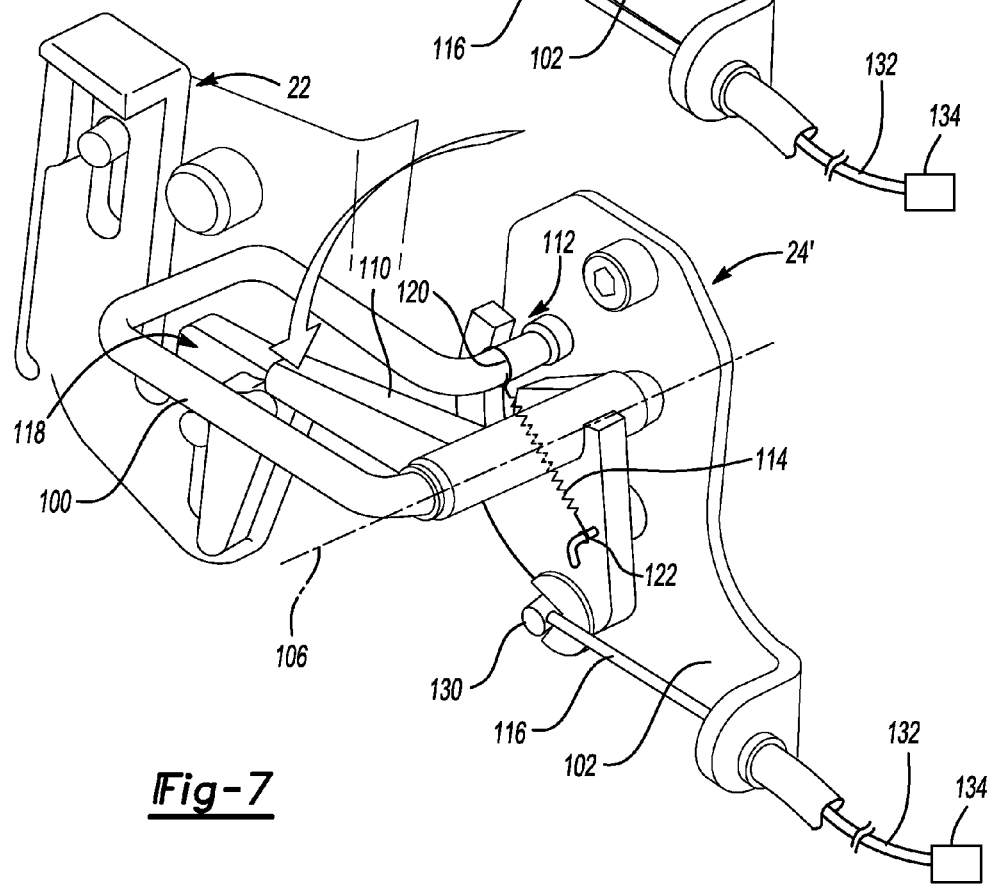
FIG. 7 is a perspective view of the striker assembly of FIG. 6 showing the latch assembly is an unlatched condition.

Referring to FIG. 7, the release unit 104 is shown after a sufficient actuation force is provided to rotate the release unit 104 and actuate the latch arm 32 to the unlatched position. A sufficient actuation force may be provided by the actuator 116 and rotate the release unit 104 in a counterclockwise direction from the perspective and position shown in FIG. 6. The actuation force may overcome the biasing force of the biasing member 114 and resistance exerted by the latch assembly 22, thereby causing the latch arm 32 to move from the latched position to the unlatched position as previously described. The release unit 104 may return from the position shown in FIG. 7 to the position shown in FIG. 6 (e.g., rotate clockwise) under the biasing force exerted by the biasing member 114 when the input device 134 is released and/or a sufficient actuation force is no longer provided.

Figure 8:
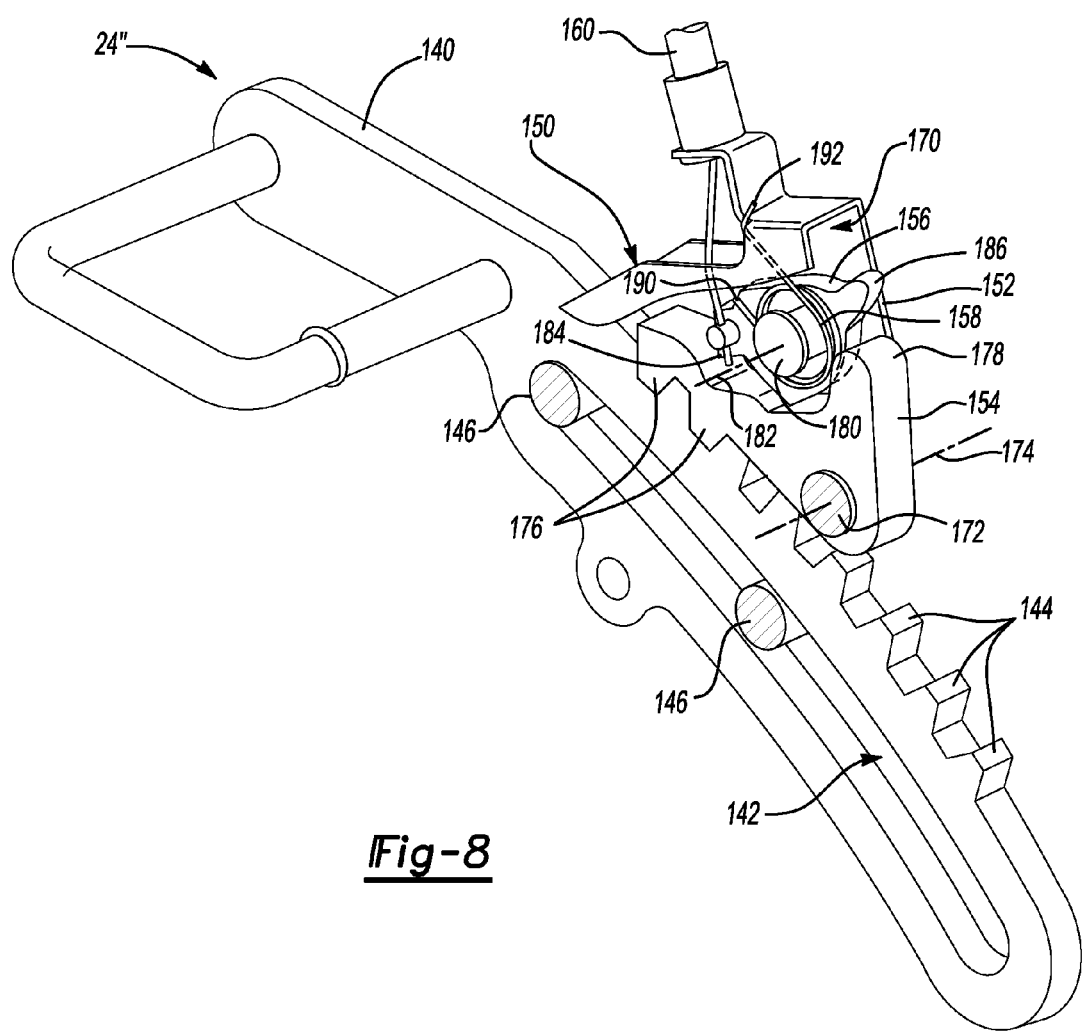
FIG. 8 is a perspective view of a third embodiment of a striker assembly.

Referring to FIG. 8, a third embodiment of a striker assembly 24" is shown. In this embodiment, the striker assembly 24" may permit a seat back 14 to be secured in a plurality of discrete locking positions. As such, the striker assembly 24" may permit a seat back 14 to tilt or recline to various angles with respect to a seat bottom 12.

The striker assembly 24" may have a striker 100 that may be used with a latch assembly 22 as previously described. The striker 100 may be disposed on a moveable mounting plate 140 that may be configured to move with respect to a mounting surface 26. The moveable mounting plate 140 may include a slot 142 and a set of teeth 144.

The slot 142 may have an arcuate configuration and may define a path of motion of the striker assembly 24". One or more mounting features 146, such as fasteners like pins or bolts, may be extend through the slot 142 and may be fixedly disposed on the mounting surface 26.

The set of teeth 144 may be disposed on the moveable mounting plate 140 and define a plurality of discrete locking positions. In at least one embodiment, the set of teeth 144 may be disposed on an exterior surface of the moveable mounting plate 140 outside of the slot 142.

A latching unit 150 may be provided to selectively position the moveable mounting plate 140. The latching unit 150 may include a housing 152, a latch 154, a release pawl 156, a biasing member 158, and an actuator 160.

Figure 9:
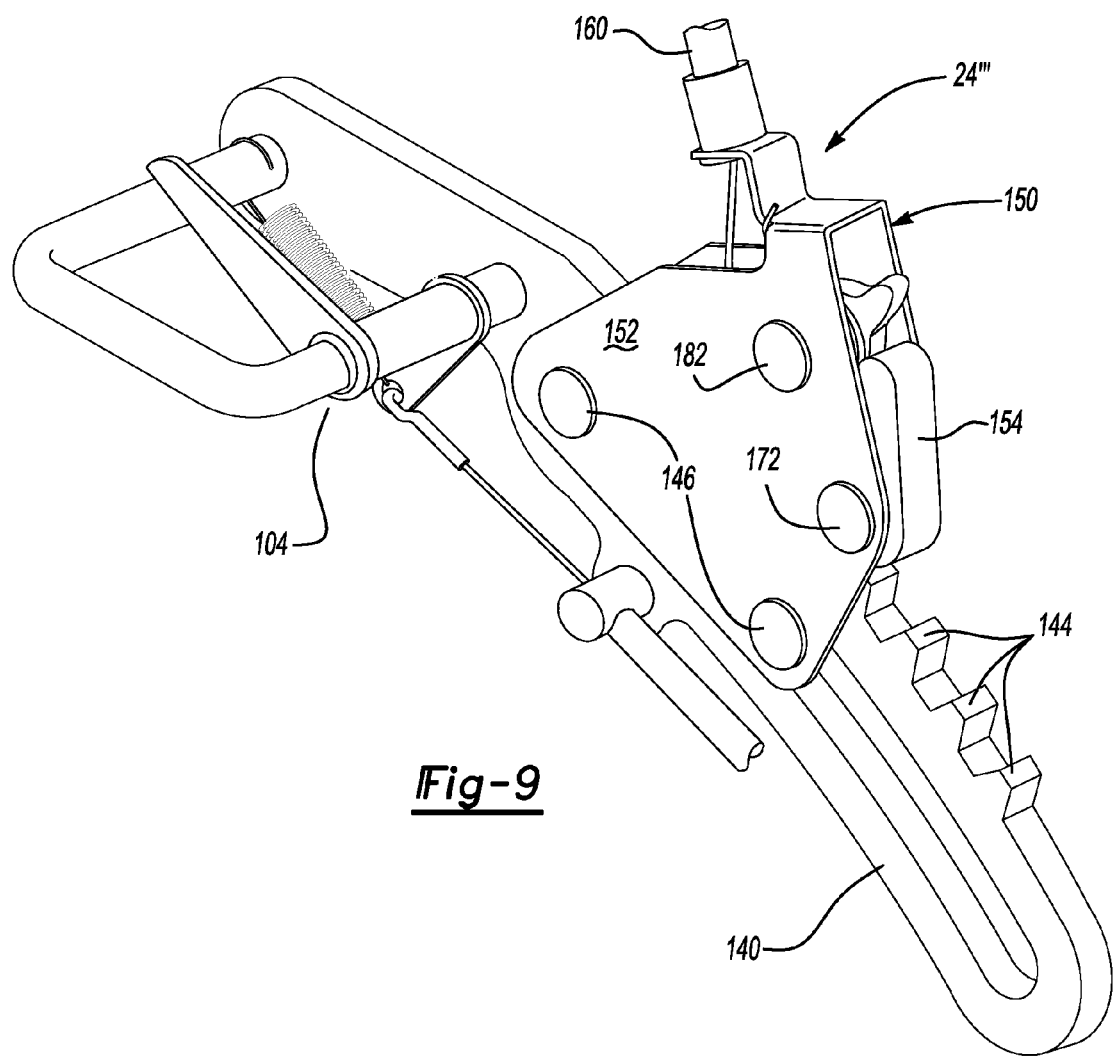
FIG. 9 is a perspective view of a fourth embodiment of a striker assembly.

The housing 152 may be fixedly disposed on the mounting features 146. The housing may define a cavity 170 for receiving various components of the latching unit 150. In FIG. 8, the housing 152 is fragmented away for clarity to show components that may be disposed inside. An embodiment of a housing 152 that is not fragmented is shown in FIG. 9.

The latch 154 may be pivotally disposed on the housing 152 with a first pivot pin 172 and may rotate about a first axis of rotation 174. The latch 154 may include one or more teeth 176 and an engagement feature 178 spaced apart from the teeth 176.

The release pawl 156 may be pivotally disposed on the housing 152 with a second pivot pin 180 and may rotate about a second axis of rotation 182. The release pawl 156 may include a first arm 184 and a second arm 186. The first and second arms 184, 186 may be generally disposed on opposite sides of the second pivot pin 180.

The biasing member 158, which may be a spring, may exert a biasing force on the release pawl 156. In at least one embodiment, the biasing member 158 may have a first end 190 that engages the first arm 184 and a second end 192 disposed opposite the first end 190 that engages the housing 152 or the mounting surface 26. In addition, the biasing member 158 may be disposed around the second pivot pin 180. The biasing member 158 may bias the first arm 184 toward the latch 154, or in a counterclockwise direction about the second axis of rotation 182 from the perspective shown in FIG. 8.

The actuator 160 may be provided to actuate the release pawl 156. The actuator 160 may have any suitable configuration, similar to the actuator 116 associated with striker assembly 24'. In at least one embodiment, the actuator 160 may be configured as a cable that may have a first end that engages the first arm 184 of the release pawl 156 and a second end disposed opposite the first end. The second end may be associated with an input device, such as button as previously described.

The striker assembly 24" may be operated as follows. Starting in the latched position shown in FIG. 8, the tooth or teeth 176 on the latch 154 may engage a tooth or teeth 144 on the moveable mounting plate 140. The biasing member 158 may exert a biasing force on the release pawl 156 (e.g., bias the release pawl 156 in a counterclockwise direction from the perspective shown) to urge the first arm 184 of the release pawl 156 against the latch 154 and urge the latch 154 against the moveable mounting plate 140.

Operation of the actuator 160 may overcome the biasing force exerted by the biasing member 158 and rotate the release pawl 156 about the second axis of rotation 182 in a clockwise direction from the perspective shown in FIG. 8. The second arm 186 of the release pawl 156 may then engage the engagement feature 178 of the latch 154 and rotate the latch 154 about the first axis of rotation 174 in a clockwise direction from the perspective shown in FIG. 8. Rotation of the latch 154 may cause the tooth or teeth 176 on the latch 154 to disengage the tooth or teeth 144 on the moveable mounting plate 140. The moveable mounting plate 140 may then move with respect to the mounting features 146 as constrained by the slot 142. Movement may occur in response to force exerted on the seat back 14, such as by user or actuation device like a motor.

The latch 154 may reengage the moveable mounting plate 140 when the actuator 160 is released. For example, the latch 154 and release pawl 156 may rotate about their respective axes of rotation 174, 182 in a counterclockwise direction in response to the biasing force exerted by the biasing member 158 when the actuator 160 is released or does not exert sufficient force to rotate the release pawl 156. As such, the tooth or teeth 176 on the latch 154 may engage a tooth or teeth 144 on the moveable mounting plate 140.

Referring to FIG. 9, a fourth embodiment of a striker assembly 24''' is shown. This embodiment combines features of striker assembly 24' with striker assembly 24". More specifically, striker assembly 24' adds the release unit 104 of striker assembly 24' to striker assembly 24". As such, the release unit 104 may actuate the latch assembly 22 as previously described and may be disposed on the moveable mounting plate 140 to facilitate adjustment of an angle of inclination of a seat back 14 as discussed with respect to striker assembly 24".

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A latching system comprising:
a latch arm having a striker slot that is configured to receive a striker; and
a biasing member having a first coil portion;
wherein the latch arm moves from an unlatched position to a latched position and the first coil portion moves across the striker slot when the first coil portion is disengaged from the latch arm.

2. The latching system of claim 1 wherein the latch arm further comprises a button, wherein the latch arm moves from the latched position to the unlatched position when sufficient force is exerted on the button.

3. The latching system of claim 1 wherein the latch arm further comprises a biasing member engagement feature, wherein the first coil portion engages the biasing member engagement feature when disposed in the unlatched position and is spaced apart from the biasing member engagement feature when in the latched position.

4. The latching system of claim 1 wherein the latch arm further comprises a first slot and a second slot spaced apart from the first slot, wherein the first and second slots are disposed substantially parallel to each other.

5. The latching system of claim 4 wherein the striker slot is not disposed parallel to the first and second slots.

6. The latching system of claim 1 wherein the biasing member further comprises a second coil portion spaced apart from the first coil portion, wherein the second coil portion is disposed around a pin.

7. The latching system of claim 1 further comprising a housing having a first wall, a second wall spaced apart from the first wall, and a third wall extending from the first wall to the second wall, the first, second, and third walls at least partially defining an opening in which the latch arm is moveably received.

8. The latching system of claim 7 wherein the biasing member includes a first end disposed on the housing and a second end disposed opposite the first end that engages the latch arm and biases the latch arm from the latched position to the unlatched position.

9. The latching system of claim 7 wherein the housing includes a striker opening configured to receive the striker, wherein the first coil portion of the biasing member is disposed proximate the striker opening when the latch arm is in the unlatched position and the first coil portion of the biasing member moves toward the third wall and away from the striker opening when the latch arm moves from the unlatched position toward the latched position.

10. A latching system associated with a seat, comprising:
a housing having an opening;
a latch arm moveably disposed in the opening and configured to move between an unlatched position and a latched position;
first and second pins disposed proximate the housing that extend through first and second slots in the latch arm, respectively, to guide movement of the latch arm;
a third pin fixedly disposed on the housing and spaced apart from the first and second pins; and
a biasing member having a first portion that engages the latch arm to hold the latch arm in the unlatched position and that biases the latch arm toward the latched position when the first portion disengages the latch arm, wherein the biasing member is disposed around the third pin.

11. The latching system of claim 10 wherein the first portion includes a coil that engages a biasing member engagement feature disposed on the latch arm disposed proximate a striker slot when the latch arm is in the unlatched position.

12. The latching system of claim 10 wherein the latch arm has a striker slot that is configured to receive a striker, wherein the biasing member has a coil that moves across the striker slot when the coil is disengaged from the latch arm.

13. The latching system of claim 10 wherein the latch arm further comprises a biasing member engagement feature and the biasing member has a coil that engages the biasing member engagement feature when disposed in the unlatched position and is spaced apart from the biasing member engagement feature when in the latched position.

14. The latching system of claim 10 wherein the latch arm further comprises a button, wherein the latch arm moves from the latched position to the unlatched position when a sufficient actuation force is exerted on the button.

15. The latching system of claim 14 wherein the latch arm further comprises an engagement feature disposed proximate the button that receives an end of the biasing member.

16. The latching system of claim 10 further comprising a striker assembly that engages the biasing member to disengage the first portion from the latch arm.

17. The latching system of claim 16 wherein the striker assembly further comprises a release unit pivotally disposed on the striker assembly, wherein the release unit includes an engagement arm that engages the latch arm to actuate the latch arm from the latched position to the unlatched position.

18. The latching system of claim 17 wherein the striker assembly includes an actuator for actuating the release unit.

\* \* \* \* \*